United States Patent
Wang

(10) Patent No.: US 7,826,527 B2
(45) Date of Patent: Nov. 2, 2010

(54) METHOD FOR VIDEO DATA STREAM INTEGRATION AND COMPENSATION

(75) Inventor: Kuan-Lan Wang, Midland House (SG)

(73) Assignee: Softfoundry International Pte Ltd., Singapore (SG)

( * ) Notice: Subject to any disclaimer, the term of this patent is extended or adjusted under 35 U.S.C. 154(b) by 1324 days.

(21) Appl. No.: 11/335,456

(22) Filed: Jan. 19, 2006

(65) Prior Publication Data

US 2007/0009041 A1 Jan. 11, 2007

(30) Foreign Application Priority Data

Jul. 11, 2005 (TW) .............................. 94123375 A

(51) Int. Cl.
 *H04B 1/66* (2006.01)
(52) U.S. Cl. .......................... 375/240; 704/500; 710/68; 382/276; 382/232; 382/251
(58) Field of Classification Search ................. 375/240; 704/500; 710/68; 382/276, 232, 251; 348/405, 348/390, 415
 See application file for complete search history.

(56) References Cited

U.S. PATENT DOCUMENTS

| 6,208,692 | B1 * | 3/2001 | Song et al. ............. 375/240.19 |
| 6,243,497 | B1 * | 6/2001 | Chiang et al. ................ 382/251 |
| 6,937,773 | B1 * | 8/2005 | Nozawa et al. ............... 382/243 |
| 7,372,903 | B1 * | 5/2008 | Lee et al. ..................... 375/240 |
| 2002/0054608 | A1 * | 5/2002 | Wan et al. .................... 370/474 |
| 2002/0054641 | A1 * | 5/2002 | Hannuksela ........... 375/240.12 |
| 2003/0235338 | A1 * | 12/2003 | Dye ............................ 382/232 |

* cited by examiner

*Primary Examiner*—David C Payne
*Assistant Examiner*—Zewdu Kassa
(74) *Attorney, Agent, or Firm*—Ladas & Parry LLP

(57) ABSTRACT

A method for video data stream integration and compensation includes using a discrete wavelet transform technique to compress and encode key frames of a video signal, and a discrete cosine transform technique to process interframe computations of the video signal, and automatically compensating and adjusting the video signal according to different factors. Since the key frames are not likely to be distorted when processed using discrete wavelet transform, and since the use of discrete cosine transform to process interframe computation facilitates realization of high-speed computations and permits fine macroblock computations, the reception quality of the video signal can be maintained.

13 Claims, 11 Drawing Sheets

| 0 | 4 | 8 | 12 | 16 | 20 | 24 | 28 | 32 | 36 | 40 | 44 | 48 | 52 | 56 | 60 |
| 1 | 5 | 9 | 13 | 17 | 21 | 25 | 29 | 33 | 37 | 41 | 45 | 49 | 53 | 57 | 61 |
| 2 | 6 | 10 | 14 | 18 | 22 | 26 | 30 | 34 | 38 | 42 | 46 | 50 | 54 | 58 | 62 |
| 3 | 7 | 11 | 15 | 19 | 23 | 27 | 31 | 35 | 39 | 43 | 47 | 51 | 55 | 59 | 63 |
| 64 | ... | | | | | | | | | | | | | | |
| 65 | ... | | | | | | | | | | | | | | |

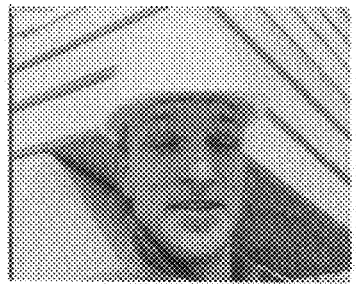
Source picture 1
FIG. 7a
Source picture 2
FIG. 7b
Interframe motion block inspection
FIG. 7c
Before composition
FIG. 8a
After composition
FIG. 8b

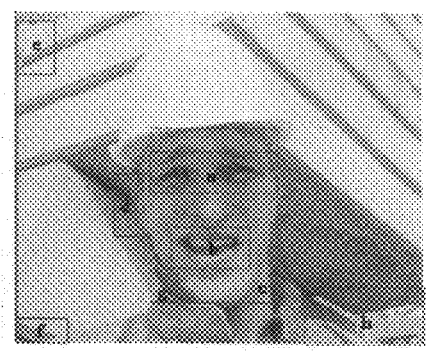
FIG. 9a     FIG. 9b
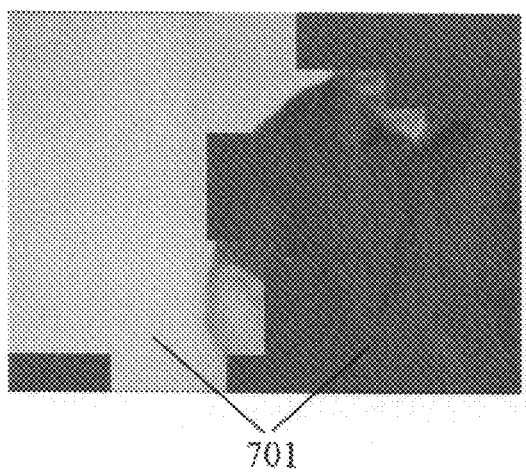
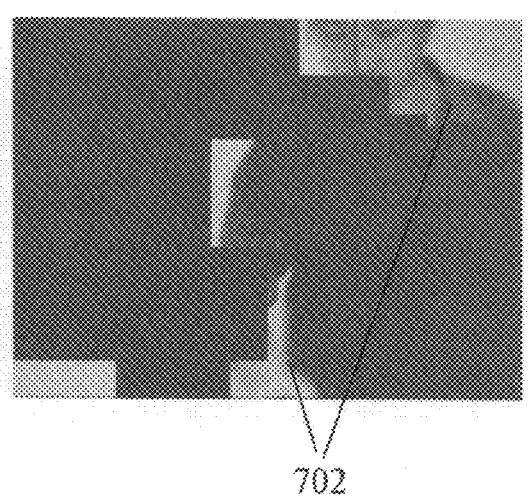
FIG. 10a     FIG. 10b Still frame compression ratio initialization curve

METHOD FOR VIDEO DATA STREAM INTEGRATION AND COMPENSATION

CROSS-REFERENCE TO RELATED APPLICATION

This application claims priority of Taiwanese Application No. 094123375, filed on Jul. 11, 2005.

BACKGROUND OF THE INVENTION

1. Field of the Invention

The invention relates to a method for code stream control, more particularly to a method for video data stream integration and compensation that can ensure signal reception quality even if there is serious packet loss during the process of video signal transmission.

2. Description of the Related Art

Due to the development of audiovisual multimedia and digital communications technologies, digital video processing systems are heading toward diversified applications. Occurrence of such a phenomenon can be attributed to the development of video signal encoding standards. With these encoding standards, a consistent communications standard for transmission among systems is made possible. Video signal encoding standards have the function of compressing data. This is necessary because source multimedia data are extremely huge. If they are not compressed to reduce the amount of data, they will take up too much bandwidth, and the receiving end would not be able to receive the huge flow of data without large delay and packet loss, thereby increasing the likelihood of errors.

Currently, there are two official organizations that set up video signal compression encoding standards. One is the ITU Telecommunication Standardization Sector (ITU-T). The other is the International Standard Organization (ISO/IEC JTC1). The ITU-T video signal compression encoding standard is expressed in H.26x format, e.g., H.261, H.262, H.263, and H.264. On the other hand, the ISO/IEC video signal compression encoding standard is expressed in MPEG-x format, e.g., MPEG-1, MPEG-2, MPEG-4, and MPEG-4 AVS.

As shown in FIG. 1, in a data stream of an MPEG video coded image, the data structure is formed by one or more sequences. Each sequence contains at least a group of pictures (GOP). The so-called GOP refers to a group formed by a plurality of frames or pictures. According to their attributes, the frames can be divided into three types: intra-coded frames (I frame), predictive-coded frames (P frame), and bidirectionally predictive-coded frames (B frame).

The intra-coded frame (I frame) is also referred to as a reference image or key frame. The predictive-coded frame (P frame) is referred to as a current image or non-key frame. Since the I frames and the P frames are adjacent to each other, and have a high degree of similarity, the P frames can be compressed by block matching, motion estimation, and motion compensation with reference to the previous I frames, and good compression results can be obtained. Hence, by reducing temporal redundancy between successive frames, data storage space can be saved.

Referring again to FIG. 1, in the MPEG compression standard, each frame is divided into a plurality of slices. Each slice is in turn divided into a plurality of macroblocks. Each macroblock is composed of luminance blocks and chrominance blocks. Each block is defined as the smallest coded unit of the MPEG data structure. In the process of motion compensation, block-based motion vector estimation is used.

Referring to FIG. 2, which illustrates a motion vector estimation in the MPEG compression standard, the search method is, for a predetermined block 51 in a current frame 501, to search and find matching pixels corresponding to the predetermined block 51 from a reference frame 502 preceding the current frame 501 so as to estimate a motion vector 53 of the predetermined block 51. In the aforesaid method, a predetermined point 520 in the reference frame 502 serves as an initial position, and a region (not shown) having the predetermined point 520 as the center serves as the search area until a matching block is found in the current frame 501 for estimating the motion vector 53.

With the estimation of the motion vector 53, and by means of each block in the current frame 501 and the optimum matching block found from the reference frame 502, the blocks in the current frame 501 can be correlated to those in the reference frame 502 using the calculated motion vector 53 and difference data such that the blocks can be shifted to proper positions according to the motion vector 53. Since it is no longer necessary to record a large portion of redundant data, the amount of data to be stored can be reduced, thereby achieving the objective of data compression.

However, when transmitting compressed video stream over the Internet, some of the information in the reference frame 502 may be lost due to the limited bandwidth and high compression rate. If the loss of information is excessive, the current frame 501 cannot be effectively recovered, resulting in degraded picture quality and being difficult to be identified clearly. All of this is due to the fact that existing technologies are incapable of effecting corresponding adjustment according to actual transmission conditions so as to maintain the required video quality.

SUMMARY OF THE INVENTION

Therefore, an object of the present invention is to provide a method for video stream integration and compensation, which involves corresponding adjustments according to actual data transmission conditions so as to comply with practical transmission requirements.

Accordingly, the method of this invention utilizes a discrete wavelet transform (DWT) technique to compress and encode key frames of a video signal, and a discrete cosine transform (DCT) technique to process interframe computations of the video signal, and automatically compensates and adjusts the video signal according to different factors.

The first object of this invention is to use a discrete wavelet transform (DWT) technique to compress and encode key frames of a video signal, and a discrete cosine transform (DCT) technique to process interframe computations of the video signal, and to compensate and adjust the video signal automatically according to different factors. Since the key frames are not likely to be distorted when processed using DWT, and since the use of DCT to process interframe computations facilitates realization of high-speed computations and is suited for fine macroblock computations, the required quality of the video signal can be maintained.

The second object of this invention is to perform motion vector estimation starting from a relatively large search area and to progressively increase the search precision in order to gradually approximate and finally obtain the closest search result, thereby enhancing the processing efficiency.

The third object of this invention is to set corresponding transmission quality levels based on usable dynamic bandwidth limitations.

The fourth object of this invention is to use a forward error correction (FEC) procedure so that the received data are substantially correct, in combination with a packet loss concealment (PLC) procedure to utilize the data at a receiving end to perform data recovery. The invention employs FEC procedure to recover a part of the data, with the rest of errors being concealed using the PLC procedure, thereby considerably improving data recovery and repair.

The fifth object of this invention is to construct an optimized matching parameter model in the video processing system. By means of the optimized matching parameters, the encoding of key frames and non-key frames is allocated with a different number of bits according to the current transmission bit rate and the available bandwidth of the network. Therefore, the encoded video stream will suffer less distortion, and the key frames and non-key frames can become the more homogeneous video stream.

The sixth object of this invention is to use an interframe balancing algorithm to solve interframe jitters or non-smooth problems so as to achieve effective suppression and compensation.

In sum, this invention performs quality control during encoding process of a video signal when there is loss or delay during the transmission process of image data. Theoretically, high transmission bit rates result in better picture quality, while low transmission bit rates result in lower picture quality. Therefore, the objective of the invention is to obtain the best video quality under a specified transmission bit rate by the interframe balancing and bit rate control.

BRIEF DESCRIPTION OF THE DRAWINGS

Other features and advantages of the present invention will become apparent in the following detailed description of the preferred embodiment with reference to the accompanying drawings, of which:

FIGS. 7a to 7c illustrate detection of interframe macroblocks in the preferred embodiment;

FIGS. 8a and 8b illustrate grouping of motion-linked areas according to the preferred embodiment;

FIGS. 9a and 9b illustrate the detection of a face area in the motion blocks based on the human face and eyes information;

FIGS. 10a and 10b illustrate that dynamic macroblocks and static macroblocks are processed differently in the preferred embodiment;

DETAILED DESCRIPTION OF THE PREFERRED EMBODIMENT

Figure 1:
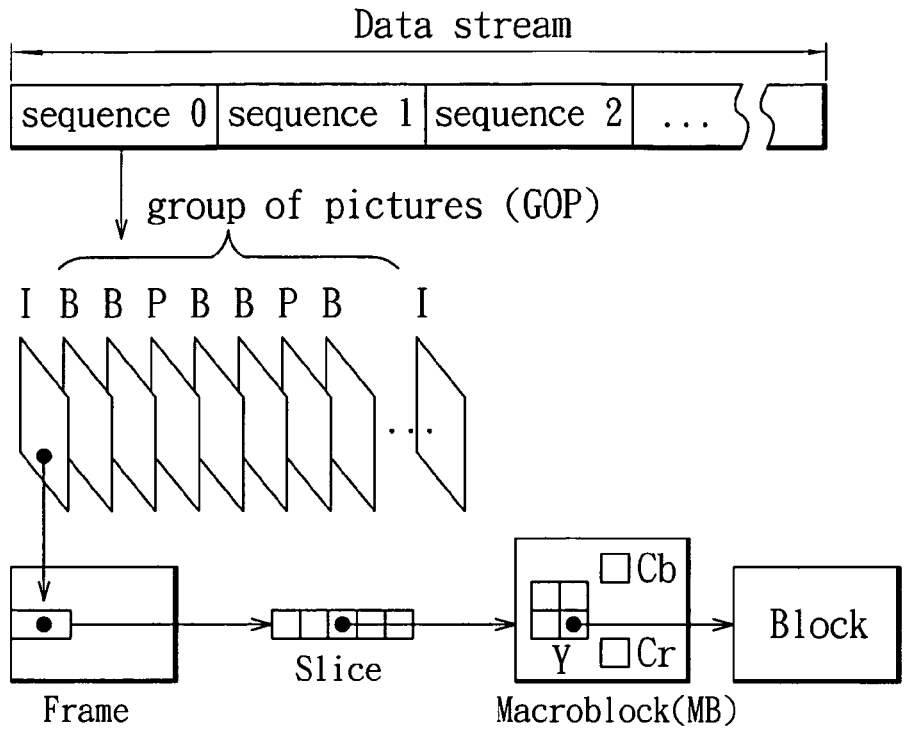
FIG. 1 is a schematic diagram illustrating the data structure of a data stream of an MPEG video coded image.
Figure 2:
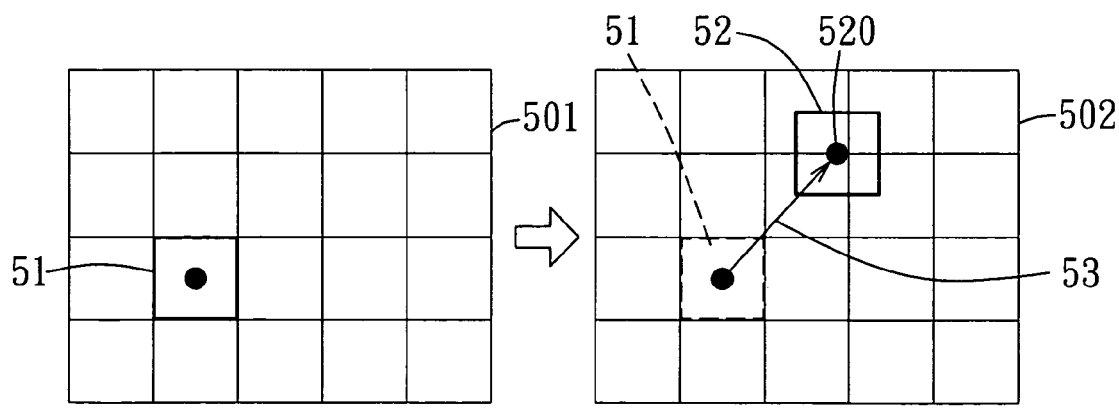
FIG. 2 is a schematic diagram illustrating the representation of a motion vector according to the MPEG compression standard.

With reference to FIG. 1 and the prior art described beforehand, it is known that since a P frame is encoded with reference to an I frame, and a B frame is a bidirectionally predictive-coded frame that is encoded with reference to immediately preceding and immediately following I or P frames, the information contained in an I frame (hereinafter referred to as a key frame) is very important. If any information of the key frame is lost or damaged during the process of transmitting video signals, the quality of the frames adjacent to the key frame will be affected adversely.

Therefore, according to the first aspect of the method of this invention, discrete wavelet transform (DWT) that has relatively low image distortion after compression is adopted for processing key frames so that the image quality of the key frames can be maintained, whereas discrete cosine transform (DCT) commonly adopted in MPEG compression standards is used to compute for the other frames so as to reduce the complexity and computational load of the system.

The method has the advantages of both discrete wavelet transform and discrete cosine transform. In particular, discrete wavelet transform is applied to key frames so that picture distortion is relatively low, the quality of the entire video stream is relatively high, and the compression rate is high to save space. At the same time, the use of discrete cosine transform for non-key frames considerably enhances computational flexibility while reducing the computational complexity of algorithms.

How a key frame is processed into a code stream output using discrete wavelet transform according to the method of this invention will now be described with reference to FIGS. 3 to 5.

The processing steps are as follows: 1. Decompose the key frame into rectangular tiles; 2. Apply Discrete Wavelet Transform (DWT) to each tile to transform into subband coefficients; 3. Perform quantization to the sub-bands of coefficients and collect them into arrays of code-blocks; and 4. Entropy coding the bit-planes of the coefficients in each code-block.

Figure 3:
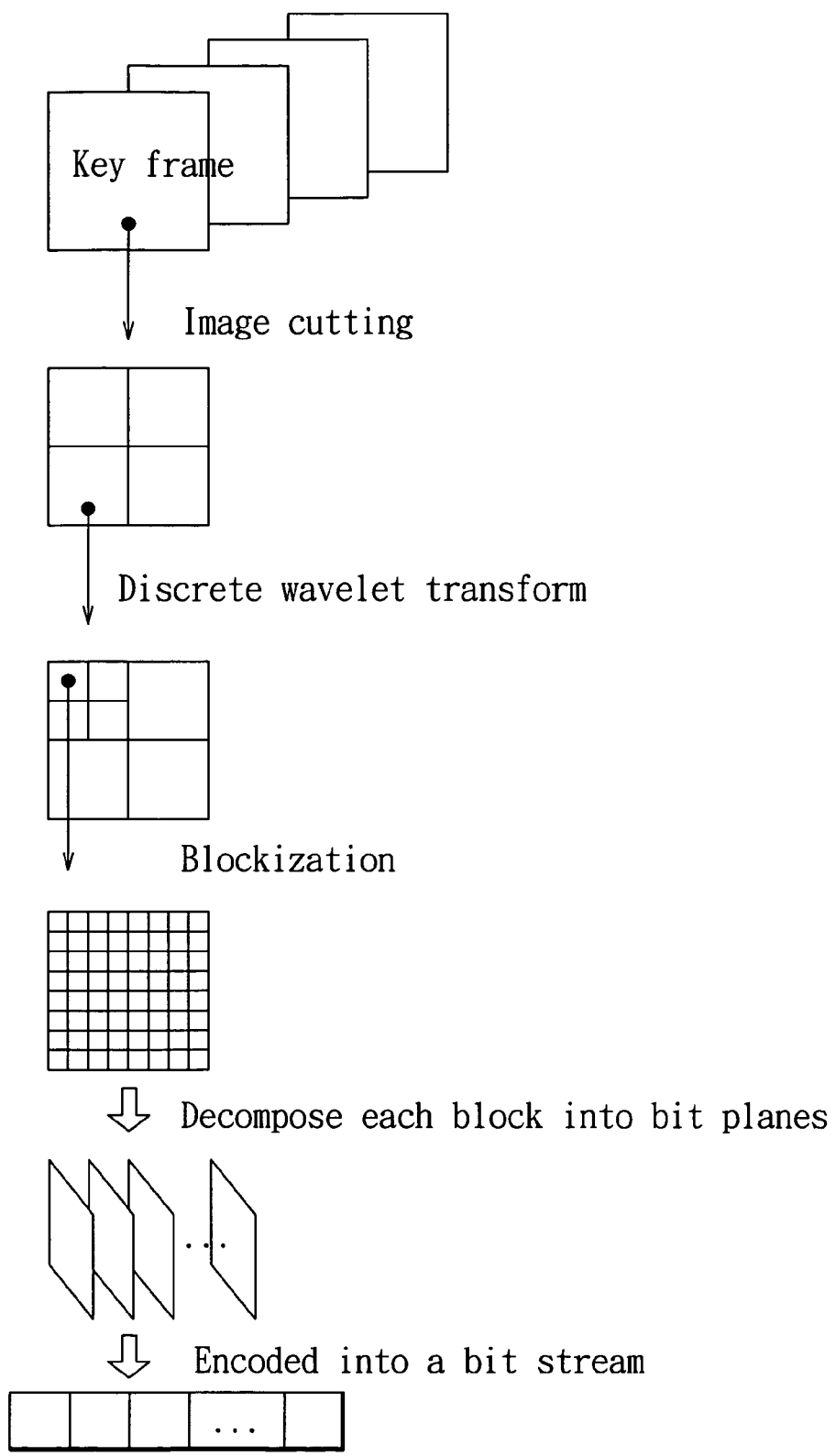
FIG. 3 is a schematic diagram showing how a key frame is processed using block encoding according to a preferred embodiment of the method of this invention so as to output a code stream.
Figures 4, 5:
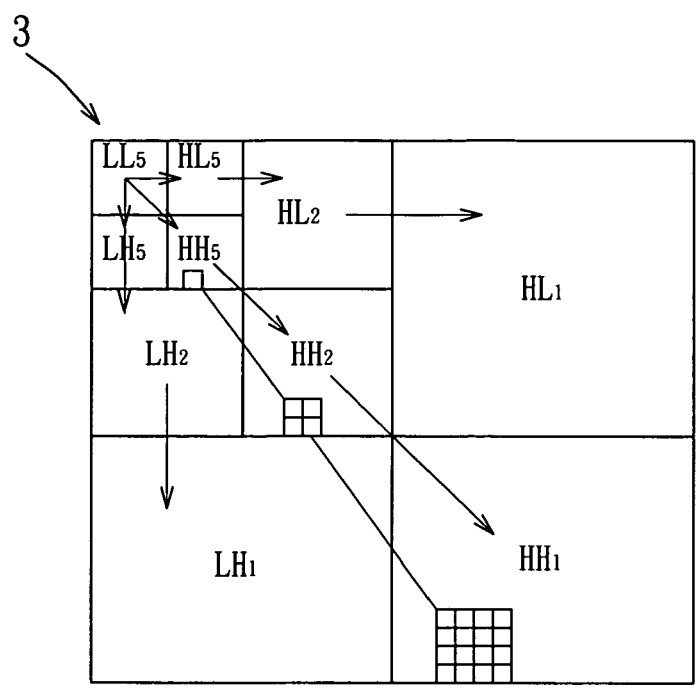
FIG. 4 is a schematic diagram illustrating an image formed into ten sub-bands using three-level discrete wavelet transform decomposition.
FIG. 5 is a schematic diagram illustrating one of the scan patterns of each bit-plane in a coded block is performed starting from the uppermost coefficients on the left, every four coefficients in a column being scanned in a row.

Reference is made to FIG. 3, which illustrates how the key frame is processed according to the method of this invention. In the scheme, the key frame in a video signal is decomposed into a plurality of rectangular tiles (e.g. tiles $A_1$ to $A_n$), and DWT is applied to each tile. For instance, each tile may be subjected to two-level wavelet decomposition to form seven different sub-bands (see FIG. 4, respectively HH1, HL1, LH1, HH2, HL2, LH2, and LL2). Additionally, FIG. 4 further shows three-level wavelet decomposition which forms ten sub-bands for the key frame 3. LL3 is a low frequency sub-band, whereas HH1 is a high frequency sub-band.

With further reference to FIG. 3, the sub-bands of coefficients are further divided into arrays of code blocks in which the transform coefficients are from the same sub-band (e.g., 64×64 or 32×32 code-blocks). Quantization is performed within the code-blocks independently. Thereafter, the bit-planes of the coefficients in each code-block are entropy coded. Since each code-block is encoded independently, the generated code streams can use variable length bits for representation according to requirements.

These bit-planes start from the non-zero most significant bit-planes (MSB) to the least significant bit-planes (LSB). FIG. 5 shows one of the scan patterns of bit-planes. Afterward, each bit-plane is encoded into code streams using entropy coding. The working principle is that each bit-plane in the encoded block is subjected to coefficient scanning using a special method. Starting from the uppermost coefficient on the left, every four coefficients in a column are scanned in a row as shown in FIG. 5 (e.g., 0,1,2,3, then 4,5,6,7, etc.), until all the coefficients in the encoded block are scanned. Then, the coefficients are arranged in ascending order based on the frequencies to which the coefficients correspond.

For the decomposition and reconstruction formulae of the discrete wavelet transform employed in the preferred embodiment, the current Mallat algorithm is used. As shown in Equations 1 to 3: Equation 1 is a wavelet function; Equation 2 is an expansion (decomposition) formula for obtaining wavelet transform coefficients; and Equation 3 is a reconstruction formula, i.e., a wavelet inverse transform formula.

$$h_n = 2^{\frac{1}{2}} \int \phi\left(\frac{1}{2}x\right)\phi(x-n)dx = \langle \phi_{l0}, \phi_{0n} \rangle \quad \text{Equation 1}$$

$$g_n = 2^{\frac{1}{2}} \int \psi\left(\frac{1}{2}x\right)\phi(x-n)dx = \langle \psi_{l0}, \phi_{0n} \rangle$$

$$c_k^{j-1} = \sum_l h_{l-2k} c_l^j \quad \text{Equation 2}$$

$$d_k^{j-1} = \sum_l g_{l-2k} c_l^j$$

$$c_k^j = \sum_l \left(h_{k-2l} c_l^{j-1} + g_{k-2l} d_l^{j-1}\right) \quad \text{Equation 3}$$

As shown in Equations 1 and 2, a digital video signal $\{c_n^0\}$ is given. The digital video signal $\{c_n^0\}$ is extended into an orthogonal basis, and the digital video signal in the orthogonal basis is $V_0$ which is defined by the function $f_0 = \Sigma c_n^0 \phi_{0n}$, where $\{\phi_{0n}\}$ is the standard orthogonal basis of $V_0$.

The DWT algorithm formulae used for the key frames, and the features exhibited thereby in terms of integrity in spatial domain and localization in frequency domain are discussed with reference to Equations 2 and 3. Since $c^j$ is the low frequency sub-band obtained from the next level of wavelet decomposition of $c^{j+1}$, $c^j$ is a smooth version of $c^{j+1}$ ($c^j$ and $c^{j+1}$ are the same frame judging from the picture, but $c^j$ is smoother, and the outlines are more blurry. Therefore, $c^j$ is referred to as a smooth version of $c^{j+1}$). $d^j$ is the high frequency sub-band obtained from the next level of wavelet decomposition of $c^{j+1}$. Therefore, $d^j$ is the difference information of $c^j$ and $c^{j+1}$. Besides, since $c^j$ is the smooth version of $c^{j+1}$, $d^j$ is the difference information of $c^j$ and $c^{j+1}$, and has good integrity in the spatial domain and good localization in the frequency domain.

The above description mainly focuses on how the key frame of the video stream is processed using discrete wavelet transform. The interframe computation of the non-key frame is explained below. The formulae used for discrete cosine transform (DCT) of the non-key frame in the preferred embodiment are shown in Equations 4 and 5. Equation 4 is a two-dimensional discrete even cosine forward transform formula for the non-key frames, whereas Equation 5 is an inverse transform formula:

$$C(u, v) = \quad \text{Equation 4}$$
$$E(u)E(v)\frac{2}{N}\sum_{x=0}^{N-1}\sum_{y=0}^{N-1} f(x, y) * \cos\left(\frac{2x+1}{2N}u\pi\right) * \cos\left(\frac{2y+1}{2N}v\pi\right)$$

$$f(x, y) = \quad \text{Equation 5}$$
$$\frac{2}{N}\sum_{x=0}^{N-1}\sum_{v=0}^{N-1} E(u)E(v)C(u, v) * \cos\left(\frac{2x+1}{2N}u\pi\right) * \cos\left(\frac{2y+1}{2N}v\pi\right)$$

where $u, v = 0, 1, \ldots N-1$, when $u=0$ and $v=0$, $E(u), E(v) = 1/\sqrt{2}$; when $u=1, 2, \ldots, N-1$, and $v=1, 2, \ldots, N-1$, $E(u), E(v) = 1$; $(u, v)$ refers to the coefficient position in the frequency domain; $(x, y)$ refers to the pixel position in the spatial domain; $f(x, y)$ refers to the pixel value placed at position $(x, y)$; $C(u, v)$ refers to the frequency coefficient value at position $(u, v)$; and N represents the width and length of a two-dimensional array. If u is 0, then E(u) is $$\frac{1}{\sqrt{2}}.$$

If v is 0, then E(v) is $$\frac{1}{\sqrt{2}}.$$

On the contrary, if u is not 0, then E(u) is 1. If v is not 0, then E(v) is 1.

The advantages of using discrete cosine transform in interframe computations are: First, discrete cosine transform has the feature of separability, and can be decomposed into one-dimensional computations to facilitate realization of high-speed computations. Second, it is more suitable for computation of relatively small areas in connection with finer interframe details, e.g., computation of 16×16 or 8×8 macroblocks.

Subsequently, the actual processing of interframe computations of non-key frames according to the method of this invention will be described with reference to FIGS. 6 to 9a and 9b, in which the processing of images primarily of a human face is exemplified. Since compression techniques using discrete cosine transform are well known in the art, they will not be discussed in detail hereinafter for the sake of brevity. The following description will be directed mainly to how the method of this invention differs from the prior art.

Initially, based on packet loss information received in step 201, the current picture quality factor denoting compression ratio for key frames and quantization coefficients for non-key frames is calculated in step 202. This calculated picture quality factor is stored in step 203. Then, the information of the eyes and face in the current scene is inspected in step 204. Information of the eyes and face in the current scene is stored for coding of eye and face areas in step 205. Inspection of interframe macroblocks is performed in step 206, as shown in FIGS. 7a to 7c and 8a and 8b, to compare two adjacent frames and to label parts that have moved (in FIG. 7c). Then, motion-linked areas are composed in step 207. After composition, a large part of the face can be framed. Motion blocks are retrieved for subsequent classification and encoding in step 208. Negligible and isolated blocks are confirmed in step 209. According to the information of the face and eyes, the face area in the motion blocks is inspected in step 210.

Allocation of code stream control parameters (i.e., the current bit rate) according to the picture quality factor is performed in step 211. In step 212, face-related areas in the blocks are retrieved for performing independent encoding, i.e., coding of face-related areas c and d in the blocks, as shown in FIG. 9b. In step 213, coding of other areas is performed, i.e., coding of other areas e, f, g, and h, as shown in FIG. 9b. In step 214, precision encoding of the eye and face areas a and b is performed, as shown in FIG. 9b. Finally, in step 215, the coding results are combined and packetized into a video stream for output. The first aspect of the method of this invention can be realized using a personal computer, the processing speed of which is 600 MHz and up.

According to the second aspect of the method of this invention, when a motion object macroblock in a frame of the video signal is detected, only the dynamic macroblocks in the frames of the video signal are calculated. As for static macroblocks, they are stored temporarily in a buffer and are not processed. As for the motion vector estimation, the search precision is increased progressively starting from a larger search area in order to gradually approximate and finally obtain a closest search result, thereby enhancing the processing efficiency.

As shown in FIGS. 10a and 10b, according to the method of this invention, dynamic macroblocks and static macroblocks are processed differently. Dynamic macroblocks, which are important components, such as a motion object 702 (human body) in a video frame, are subjected to further computation, whereas static macroblocks, such as a non-motion object 701 (background) in the video frame, are stored temporarily in the buffer.

Figure 11:
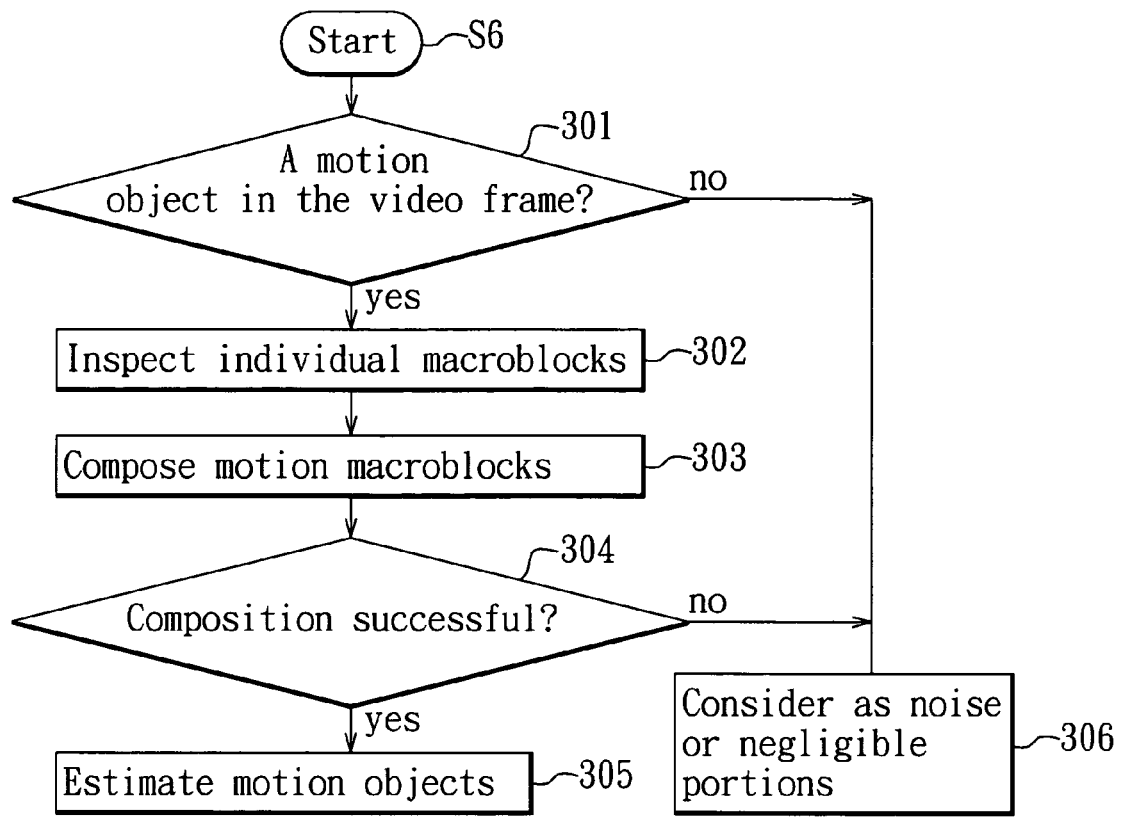
FIG. 11 is a flowchart illustrating a scheme used in the preferred embodiment to detect motion objects.

Reference is made to FIG. 11 to illustrate the method of detecting motion objects. Initially, in step 301, it is detected whether there is a motion object macroblock in the video frame. Then, in step 302, the individual macroblocks are inspected, and the features thereof are classified into several feature classes, such as background, foreground, and marginal areas. The individual motion macroblocks are composed in step 303 according to the feature classes, so as to achieve the objective of the classified encoding. Upon determination that the composition is successful in step 304, all the motion objects in the picture can be estimated as shown in step 305. If it is determined in step 301 that the macroblocks are not motion macroblocks, or the composition in step 304 has failed because the macroblocks do not have the classified features such as common motion directions, step 306 is performed to consider that they are noise or negligible portions.

In motion vector search process, a set splitting scheme is generally used. The sets are mainly classified as follows: R1={current position}; R2={motion vectors of four spatially adjacent blocks that are respectively on the left and right sides and the upper and lower sides of a reference position}; and R3={a motion track pointed to by the motion vectors of the reference position}.

The sequence of motion vector search processing is illustrated as follows:

(i) The motion vectors in set R1 are inspected, and a current minimum sum of absolute difference (SAD) is calculated. If the calculated SAD value is less than a threshold value T1, the search is stopped, and the current position is confirmed to be the optimum motion vector. Otherwise, the flow proceeds to (ii);

(ii) The motion vectors in the set R2 are inspected, and the current minimum SAD is calculated. If the value is less than a threshold value T2, the search is stopped, and the current position is confirmed to be the optimum motion vector. Otherwise, the flow proceeds to (iii); and (iii) The motion vectors in the set R3 are inspected, and the current minimum SAD is calculated. If the value is less than a threshold value T3, the search is stopped, and the current position is confirmed to be the optimum motion vector. Otherwise, an advanced search with a higher search precision is performed.

The process of the motion vector search according to the method of this invention is illustrated with reference to FIG. 12. The basic search unit is a single block, and the size of each block at X or Y axis can be different (e.g. 16×16 pixel block, or 8×8 pixel block) By reducing the range of the block, a higher search precision can be obtained. If the optimum motion vector could not be achieved at a specific search precision, e.g., using 16×16 pixel block as the search unit, the search precision would be increased through 8×8 pixel block-based searching. In particular, the search process begins with a larger search area, e.g. 16×16 pixels, and the search precision is increased progressively to 8×8 pixels, 1×1 pixel, and ½×½ pixel to gradually approximate and finally obtain the closest search result.

Figure 12:
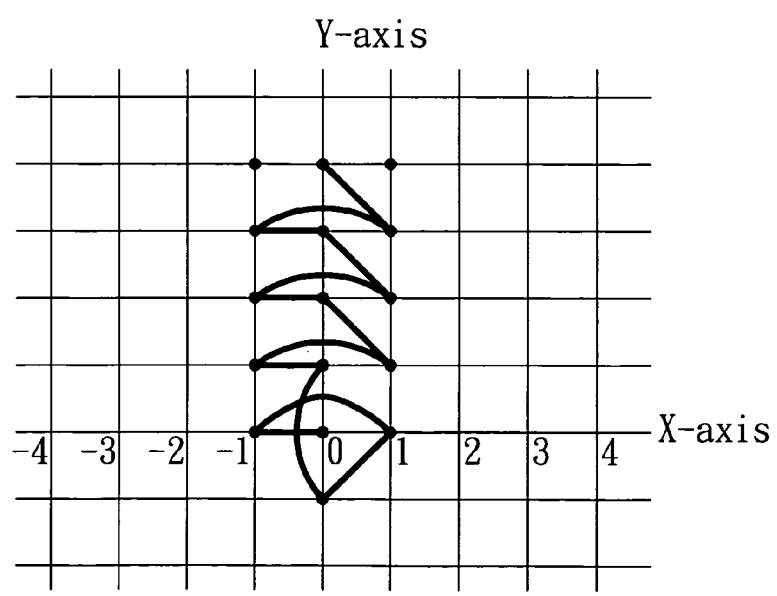
FIG. 12 is a schematic diagram illustrating motion vector search processing according to the preferred embodiment, which enhances the processing efficiency by progressively increasing search precision with gradually diminished search areas.

FIG. 12 shows the search process for a specific precision (16×16 pixel block-based). It starts from the origin point (0,0), then goes to the coordinate (−4,0), (0,4), (4,0), and ends at the coordinate (0,−4) by using 4 blocks as the beginning search range. In the second step of the search process, the search range changes to 2 blocks, and the start point is allocated on the coordinate (0,4) on condition that the direction of the motion vector is up from the start point. The search sequence is left side, upper side, and right side, respectively. The next search process under this precision begins with the coordinate (0,6), and uses 1 block as the search range. Afterward, if the optimum motion vector still cannot be obtained, the search process continues under a higher search precision.

The second aspect of the method of this invention can also be realized using a personal computer, the processing speed of which is 600 MHz and up.

According to the third aspect of the method of this invention, based on the bandwidth conditions used by different amounts of transmitted data, corresponding transmission levels are set so that data transmission is made more flexible.

Figure 13:
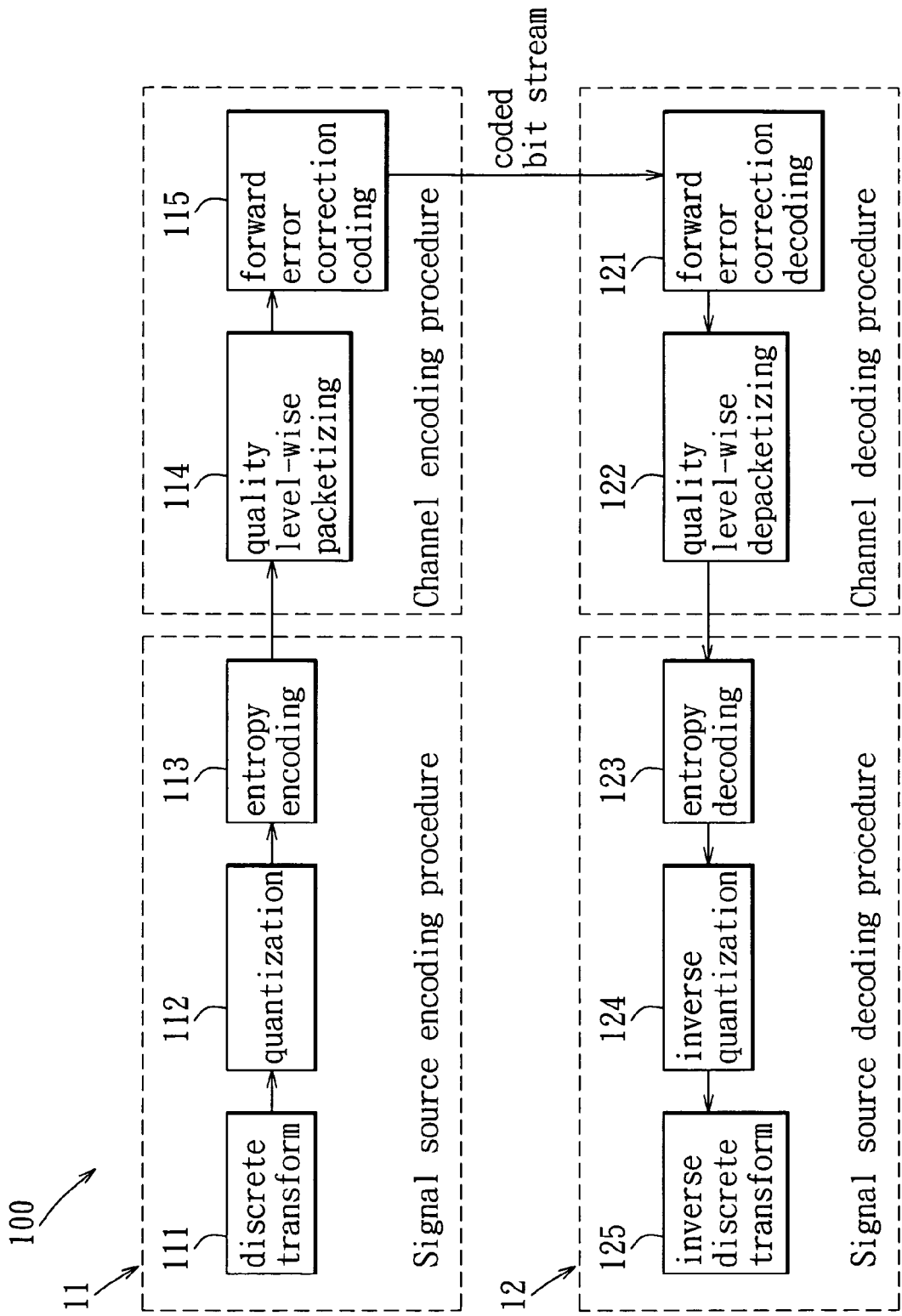
FIG. 13 is a block diagram of a video processing system of the preferred embodiment, illustrating the steps executed by a sending end and a receiving end of the video processing system.

FIG. 13 illustrates a video processing system 100 which is responsible for compression, transmission, decompression, and reconstruction of video signals according to the method of this invention. The video processing system 100 has a sending end 11 to perform a signal source encoding procedure and a channel encoding procedure. The signal source encoding procedure includes a discrete transform step 111, a quantization step 112, and an entropy encoding step 113. The channel encoding procedure includes a quality level-wise packetizing step 114 and a forward error correction coding (FEC coding) step 115.

A receiving end 12 of the video processing system 100 is responsible for a channel decoding procedure and a signal source decoding procedure. The channel decoding procedure includes a forward error correction decoding step 121 and a quality level-wise depacketizing step 122. The signal source decoding procedure includes an entropy decoding step 123, an inverse quantization step 124, and an inverse discrete transform step 125.

In the signal source encoding procedure, discrete cosine transform (DCT) or discrete wavelet transform (DWT) is applied to transform an inputted source video signal into transform coefficients. In the quantization step 112, the transform coefficients are quantized using a corresponding quantization coefficient. In the entropy encoding step 113, the quantized results are encoded using a scheme which may be Huffman encoding or Arithmetic encoding. Correspondingly, the receiving end 12 also needs to carry out the entropy decoding step 123, the inverse quantization step 124, and the inverse discrete transform step 125 so as to reconstruct the video signal.

As shown in Table 1, forward error correction (FEC) procedure is used in combination with packet loss concealment (PLC) procedure according to different packet loss rates in the method of this invention. Packet loss rate is defined as a ratio of the number of lost packets to the total number of transmitted packets. Different packet loss rates correspond to different forward error correction levels. The forward error correction procedure and the packet loss concealment procedure are used at distributed percentages at each forward error correction level within the predicted range (0-40%) of different packet loss rates to recover the transmitted video signal.

TABLE 1

|  |  | Percentage | | | | |
|---|---|---|---|---|---|---|
| Packet loss rate |  | 0 | 10% | 20% | 30% | 40% |
| Forward error correction level |  | 0 | 1 | 2 | 3 | 4 |
| Predicted repair distributed percentages | FEC | 0 | 3% | 5% | 10% | 20% |
|  | PLC | 0 | 7% | 15% | 20% | 20% |

In the method, the packets are considered lost if the transmitted packets arrive too late and exceed the length of the buffer in the decoding side of the video processing system 100. The forward error correction procedure is used to recover a part of the data, while the rest of the data that cannot be recovered is concealed using packet loss concealment. Use of these procedures in combination ensures an acceptable level of identification of the video signal even under the condition that the packet loss rate is 40%.

The distribution of percentages is, for instance, the forward error correction level is automatically adjusted to 1 when the packet loss rate rises to above 10%, and is adjusted to 2 when the packet loss rate is above 20%. On the contrary, when the packet loss rate drops to 10%~20%, the forward error correction level is automatically adjusted back to 1.

Figure 14:
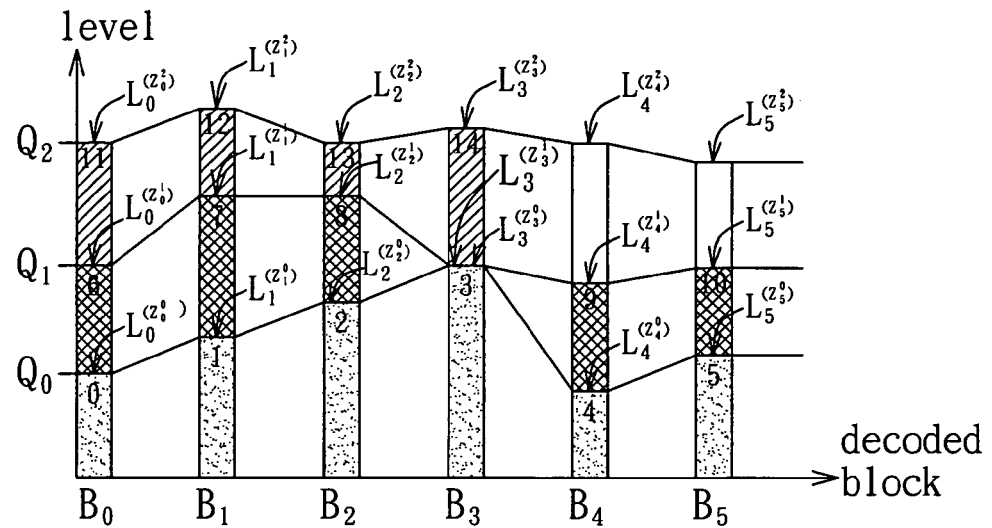
FIG. 14 is a graph illustrating the setting of corresponding transmission levels of current usable bandwidths and bit rate according to different quality levels.

As shown in FIG. 14, in the quality level-wise packetizing step 114, the packetizing operation is based on dividing the transmission levels of current usable bandwidths and bit rate according to different quality levels. In particular, the current usable bandwidth and bit rate are determined by packet loss ratio of the video stream. In this embodiment, each quality level denoted by $Q_i$ corresponds to the different code-blocks $B_i$ as shown in FIG. 14. The quality level is built in such a way that the image quality will increase gradually with each level, and the image distortion will shrink from level to level. Particularly, some code-blocks may be empty at a certain level, e.g., $B_3$ does not include any bit stream in $Q_1$. Hence, a code stream formed from quality levels has a flexible distortion rate, and the data thus compressed has a progressive transmission characteristic after encoding.

As shown in Table 2, in the channel encoding/decoding procedure, corresponding transmission levels are set according to the current usable bandwidth and bit rate in the quality level-wise packetizing step 114. Each transmission level is assigned a bit rate. The grouped code-blocks corresponding to quality levels are split into packets. The level to which each data packet belongs is determined during transmission/reception. Then, each data packet is encoded according to the bit rate assigned thereto based on the level thereof, or is decoded according to the bit rate assigned thereto based on the level thereof in the quality level-wise depacketizing step 122. Table 2 shows the quality levels and the corresponding transmission levels for a video processing system, where n is the total number of packets, and k is the number of effective packets (packet loss ratio=(n−k)/n).

TABLE 2

|  | Quality level | | | | |
|---|---|---|---|---|---|
|  | Q0 | Q1 | Q2 | Q3 | Q4 |
| Level | 4 (n = 30, k = 18) | 3 (n = 20, k = 16) | 2 (n = 10, k = 8) | 1 (n = 10, k = 9) | 0 (n = 1, k = 1) |

The error correcting scheme used in the forward error correction encoding step 115 and the forward error correction decoding step 121 in the aforesaid channel encoding/decoding procedures is described as follows:

Also in Table 2, n and k refer to a matrix of n columns and k rows in the forward error correction.

(1) A matrix G of n columns and k rows is constructed in an encoder at the sending end 11. Any k*k sub-matrix g of the matrix G is invertible. Each element in the matrix G is an element of the Galois Field GF(8). Each of packet size bytes in K data packets corresponds to an element in the Galois Field GF (8);

(2) Linear transformation of the k data packets of the source data is performed using the matrix G to obtain n data packets with packet size bytes, then data packets being coded data of a codeword, the coded data of the codeword being transmitted to the receiving end 12 of the video processing system 100;

(3) If a codeword having data packets not less than k is received by the decoder at the receiving end 12, the columns in the matrix G to which the k data packets correspond are used to construct a corresponding sub-matrix g; and (4) Since the sub-matrix g is an invertible matrix, the only solution to the corresponding linear equation can be solved as reconstructed data of the k correct data packets prior to encoding at the sending end 11.

Figure 15:
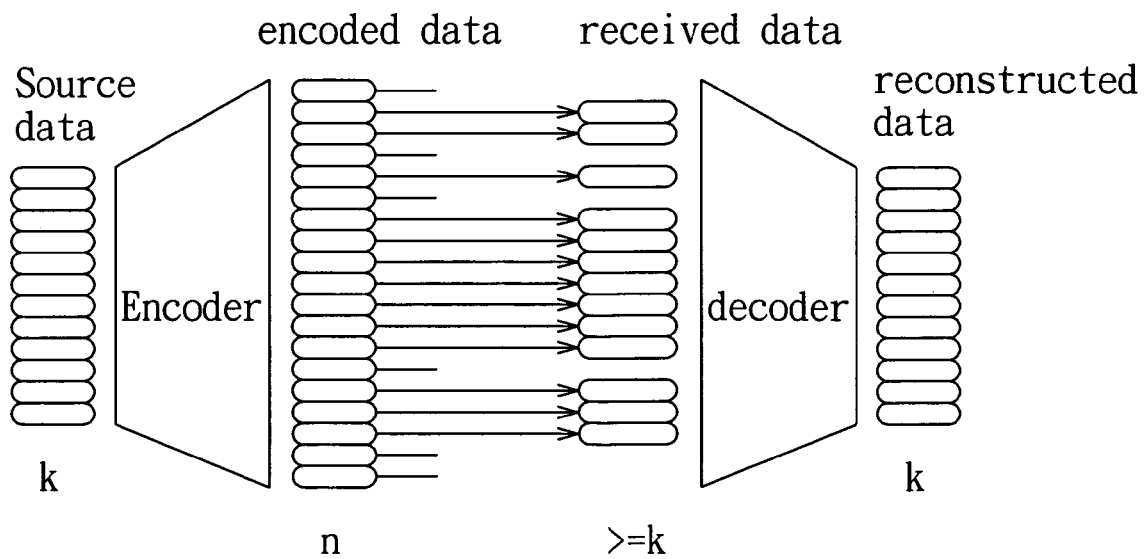
FIG. 15 is a schematic diagram illustrating a forward error correction procedure used in the preferred embodiment.

FIG. 15 illustrates how the source data is encoded into coded data via the forward error correction at the sending end 11. If the data received by the receiving end 12 is a codeword greater than or equal to k packets, the codeword can be decoded via forward error correction decoding into k packets so that the receiving end 12 can solve all the k packets that are encoded at the sending end 11 during transmission without generating any errors.

In order to improve the performance of error recovery for the video signal, the packet loss concealment (PLC) process is applied in combination with forward error correction.

For video signal, there exists significant statistical redundancy between adjacent video frames in the temporal domain in addition to the redundancy within each frame in the spatial domain. The straight forward approach to perform packet loss concealment is to interpolate a damaged block from its neighboring blocks using the spatial redundancy, assuming that they are reconstructed correctly. Otherwise, a temporal interpolation can always achieve better error concealment. In practice, packet loss concealment is implemented in a combination of techniques of these two kinds.

One simple way is replacing a damaged macroblock utilizing the spatially corresponding macroblock in the previous frame. Although this method is simple, it can produce potential problems in the presence of motions. Usually, significant improvement can be obtained by replacing the damaged marcoblock with the motion-compensated block. The encoder sends the motion vectors for intra-coded macroblocks, so that these blocks can be recovered better if damaged. When the motion vectors are also damaged, they need to be estimated from the motion vectors of surrounding macroblocks.

According to the fifth aspect of the method of this invention, an optimized matching parameter model is constructed in the system. By means of the optimized matching parameters, the encoding of the key frames and non-key frames is allocated with a different number of bits according to the current transmission bit rate and the available bandwidth of the network. Therefore, the encoded video stream will suffer less distortion, and the key frames and non-key frames can become the more homogeneous video stream.

To unify the key frames and non-key frames into a video stream, it is necessary to construct an optimized matching parameter function model shown below:

$$r = \left(\frac{c_1}{Q} + \frac{c_2}{Q^2}\right) * S$$

where r represents the bit rate; S represents the coding complexity; Q is the picture quality factor denoting the compression ratio of the key frames or the quantization coefficient of the non-key frames; and c1 and c2 are distortion constants.

Figure 16:
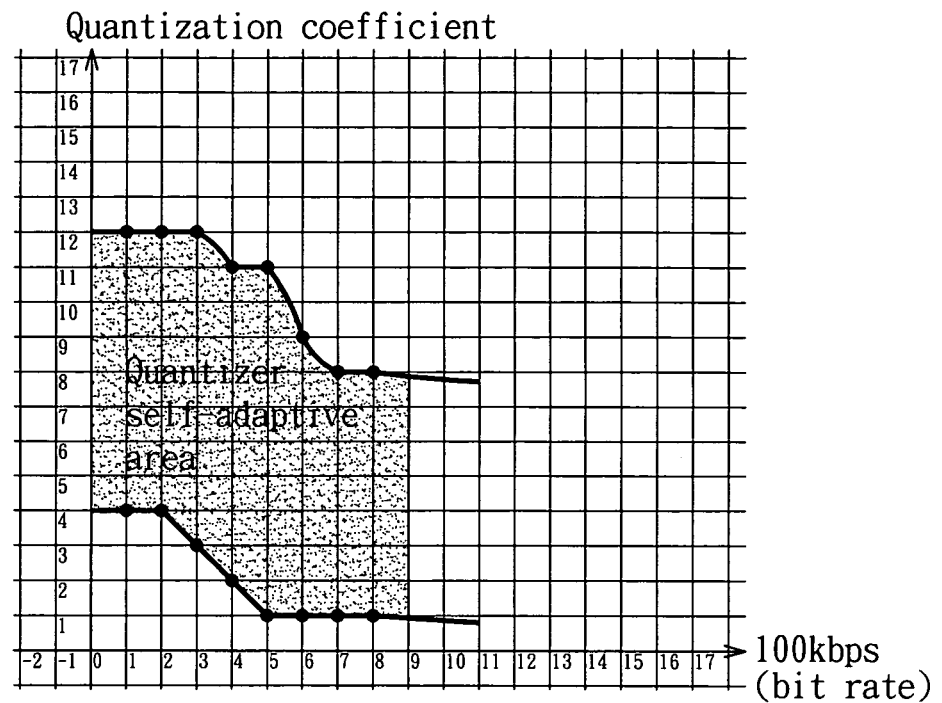
FIG. 16 is a plot illustrating a self-adaptive area of initial quantization coefficients.
Figure 17:
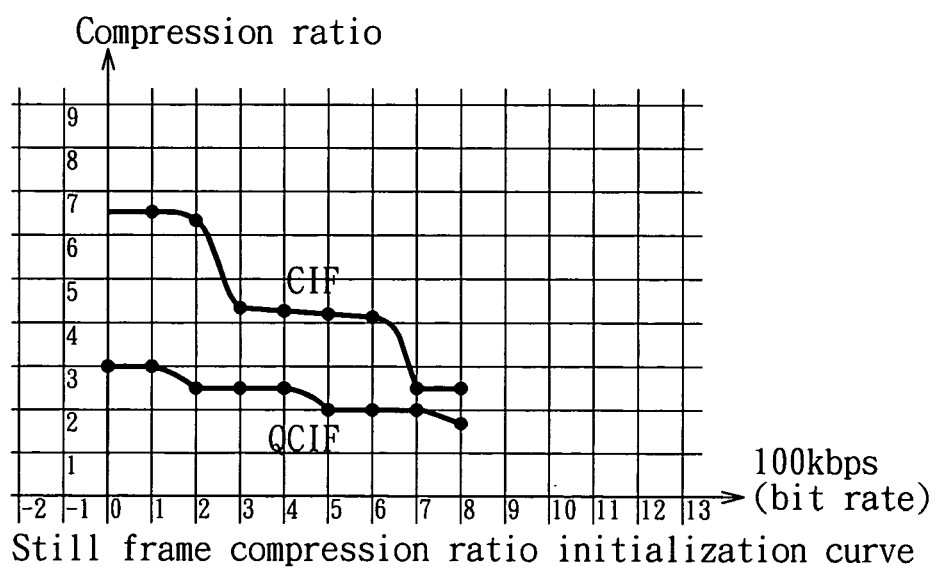
FIG. 17 is a plot showing a self-adaptive area curve of compression ratios.

The optimized matching parameter model can be applied in preparation for the following tasks:

(1) Initialization of the picture quality factor: For the key frame, the initial compression ratio value to which a bit rate parameter corresponds is found from the compression ratio curve which is a statistical curve, as shown in FIG. 17. As for the non-key frame, a quantizer self-adaptive area is initialized, as shown in FIG. 16 (also a statistical curve). Respectively, the two curves are the upper limit and lower limit of the area. Both are the key steps to achieve interframe balance.

(2) Calculation of a target bit rate of a current frame: In this regard, reference can be made to an algorithm for the current frame target bit rate to be described in the succeeding paragraphs;

(3) According to the optimized matching parameter, solving the compression ratio for key frames and the quantization parameters for non-key frames; and (4) Update the parameters of the optimized matching parameter model.

Figure 18:
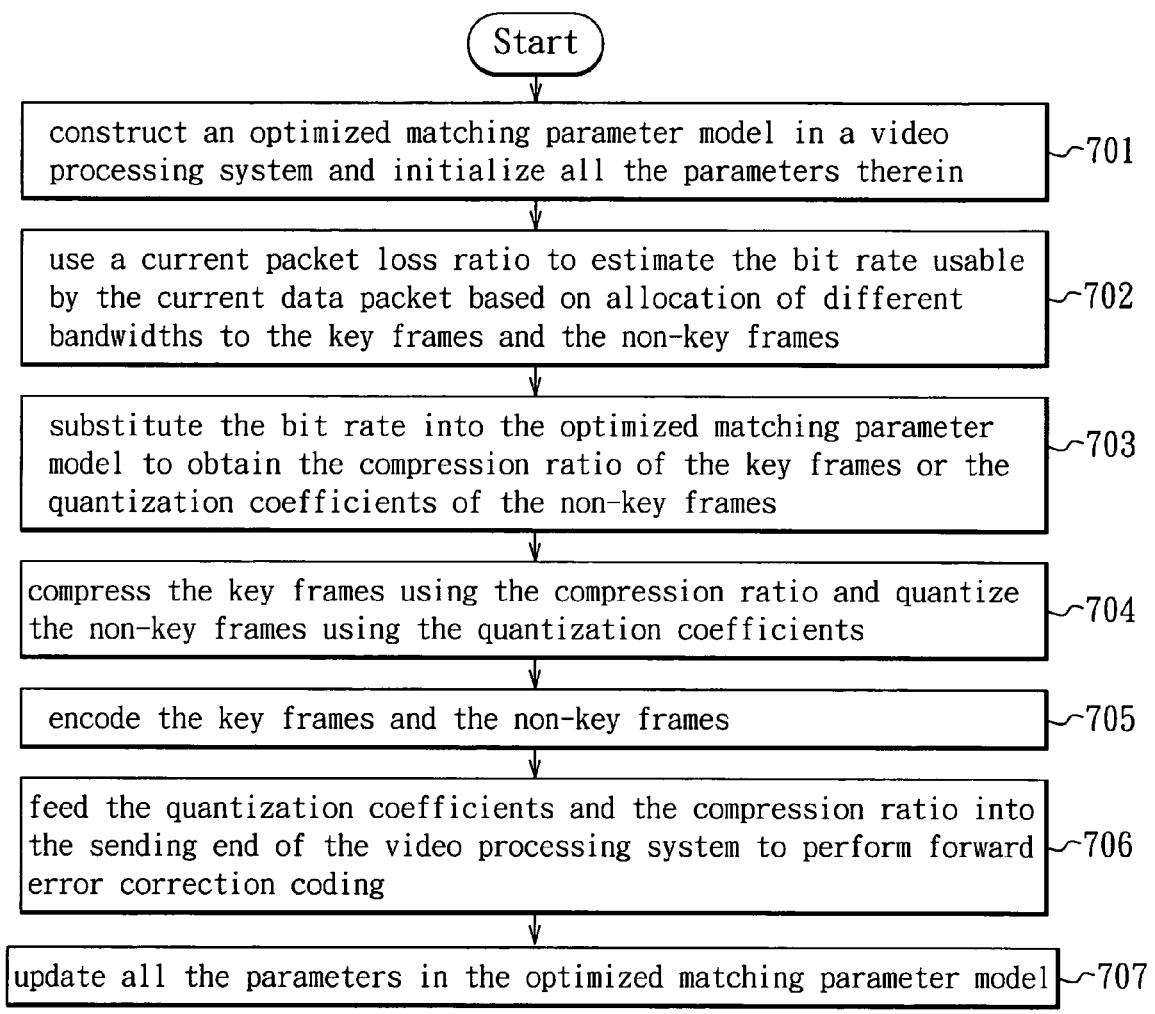
FIG. 18 is a flowchart illustrating construction and use of an optimized matching parameter model in the preferred embodiment.

Reference is made to FIG. 18 to illustrate construction and use of the optimized matching parameter model according to the method of this invention. The optimized matching parameter model is mainly used to adjust compression ratios of the key frames, and to adjust quantization coefficients of the non-key frames so as to achieve the objective of self-adaptive adjustment of coding length.

Step 701: An optimized matching parameter model is constructed in the video processing system 100, and the parameters in the model are initialized. The optimized matching parameter model is as shown in Equation 6, where r represents the bit rate; S represents the coding complexity; Q represents the compression ratios of the key frames and the quantization coefficients of the non-key frames; and $c_1$ and $c_2$ are distortion constants.

$$r = \left(\frac{c_1}{Q} + \frac{c_2}{Q^2}\right) * S \qquad \text{Equation 6}$$

If there is an input of a key frame, the optimized matching parameter model is as shown in Equation 7, where r, S, Q, $c_1$ and $c_2$ are defined as those in Equation 6; P represents an information re-sending parameter of the key frame; and c3 represents the packet loss ratio during transmission.

$$r = \left(\frac{c_1}{Q} + \frac{c_2}{Q^2} + \frac{c_3}{P}\right) * S \qquad \text{Equation 7}$$

Step 702: The packet loss ratio is used to estimate the bit rate r, which can be used by the current data packet based on the allocation of different bandwidths to the key frames and the non-key frames. The bit rate r makes reference to the number of currently used bits and the bit rate of the closest frame.

Step 703: The bit rate is substituted into the optimized matching parameter model to obtain the value of Q (the compression ratio of the key frames or the quantization coefficients of the non-key frames), where S, $c_1$, $c_2$ can be obtained from parameters of previous frames; $c_3$ is the current transmission packet loss ratio; and P is an information re-sending parameter of the most adjacent key frame. All of the above are known parameters. The above parameters are substituted into the optimized matching parameter model to obtain the value of Q using numerical approximation.

Step 704: Compression of the key frames is performed using the compression ratio obtained in step 703, whereas quantization of the non-key frames is performed using the quantization coefficients.

Step 705: The key frames and the non-key frames are encoded after the process of compression and quantization.

Step 706: The quantization coefficients and the compression ratio are fed back into the sending end 11 of the video processing system 100 to perform forward error correction coding.

Step 707: The parameters in the optimized matching parameter model are updated to self-adaptively adjust the contents of the data requiring decoding at the receiving end 12 of the video processing system 100.

According to the sixth aspect of the method of this invention, an interframe balancing algorithm is primarily used to effectively suppress and compensate the problems of interframe jittering and non-smoothness. Occurrence of such problems is attributed to the use of different computational techniques to process the key frames and the non-key frames, which can result in a discontinuous visual effect for the entire video stream.

Figure 6:
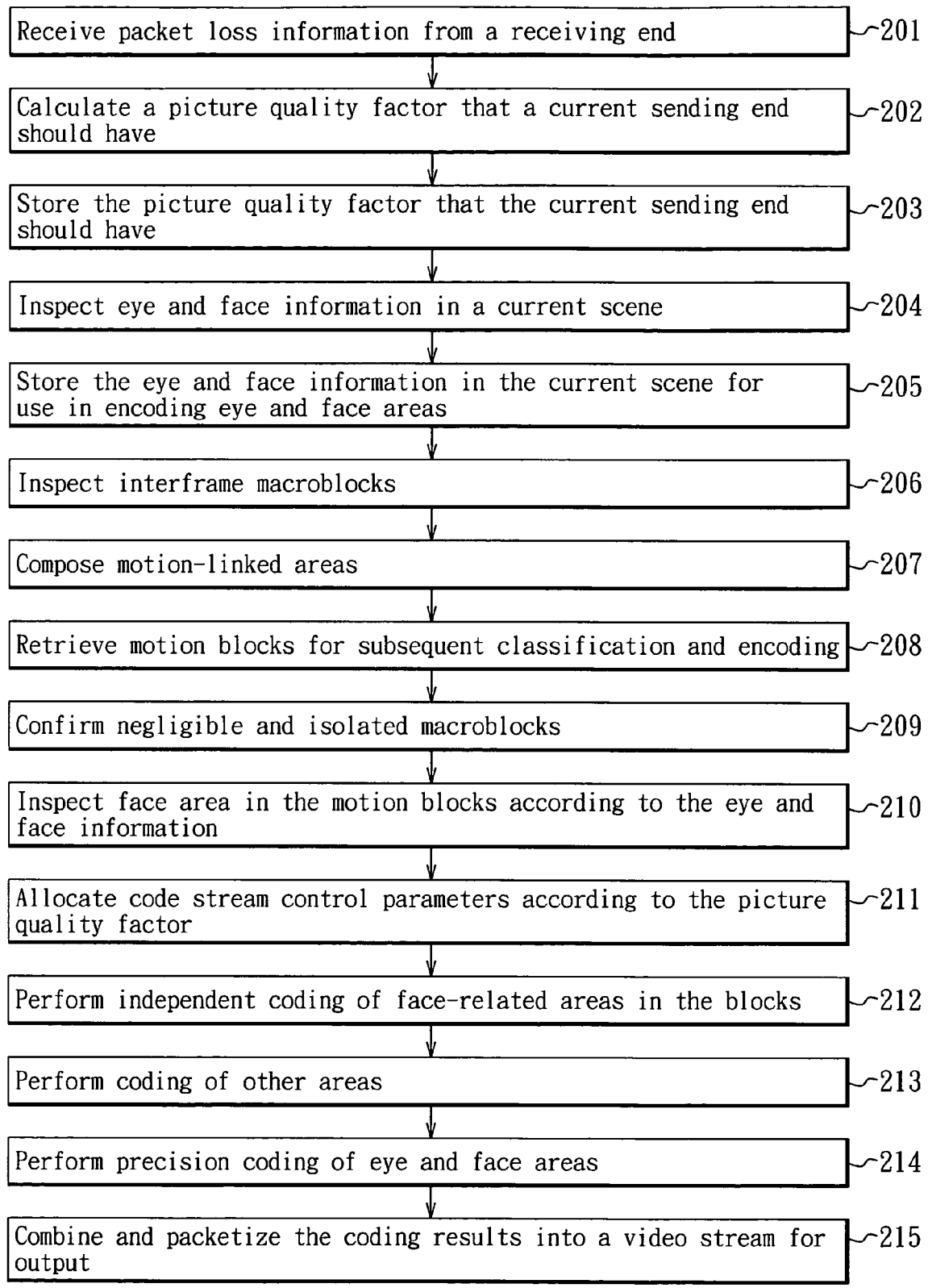
FIG. 6 is a flowchart illustrating the actual processing of interframe computations of non-key frames in the preferred embodiment, primarily using the image of a human face as an example.

Referring to FIG. 6, the processing of interframe balance is mainly focused on the storing of the picture quality factor the sending end 11 currently has in the aforesaid step 203, and the allocation of the current bit rate according to the picture quality factors the sending end 11 currently should have in step 211.

The so-called interframe balance is to correct the visual discontinuities through adjustment of the luminance and picture quality factor of the key frames and the non-key frames so as to realize the algorithm for calculating the target bit rate of the current frame. The target bit rate is determined based on the number of used bits and the bit rate of the closest frame. The algorithm is presented as follows:

```
if (Key Frame ) /*key frame*/
{
T = T_i * 0.80 + S * 0.20;
/*T_i represents actual code bit number of the previous
  frame, and S represents the coding complexity*/
if(T>=^{Brate / Frate})
T =^{Brate / Frate} + (^{Brate / Frate} -T) * 0.75;
else
T = Brate/Frame + (Brate/Frame - T) * 1.25
/*calculate the target rate of the current frame*/
min = Brate / Frame * 0.1;
max = Brate / Frame * 10;
T = rang(min,max); /*prevent overflow and underflow*/
}
else /*non-key frame*/
{
T = T_i * 0.90 + S * 0.10 ,
if(T>=^{Brate / Frate})
T =^{Brate / Frate} + (^{Brate / Frate} -T) * 0.65;
else
T = Brate/Frame + (Brate/Frame - T) * 1.35
/*calculate the target bit rate of the current frame*/
min = Brate / Frame * 0.05;
max = Brate / Frame * 2;
T = rang(min,max); /*prevent overflow and underflow*/
    T_i = B_i / F_i
/* B_i represents the remaining bandwidth at the last
   second; F_i represents the remaining number of frames
   at the last second*/
if (T<T_i / 2)
T = T_i - T;
```

To sum up, the method of this invention has the following advantages:

1. Compared with prior video compression techniques which use either discrete wavelet transform technology or discrete cosine transform technology for video compression processing, the method of this invention combines the advantages of these two technologies. In particular, discrete wavelet transform is used to process key frames, whereas discrete cosine transform is used for the interframe computations of non-key frames. Thus, since the key frames are not likely to be distorted when discrete wavelet transform is used, error is not likely to result during matching of the non-key frames when motion vector estimation is performed. On the other hand, the use of discrete cosine transform to process interframe computations facilitates realization of high-speed computations, and is suited for fine macroblock computations.

2. As the motion vector search processing in the method of this invention starts from a relatively large search area and progressively increases the search precision in order to gradually approximate and finally obtain the closest search result, the processing efficiency can be enhanced.

3. In the method of this invention, since corresponding transmission levels are set based on different usable dynamic bandwidth limitations, and since each transmission level is allocated a bit rate such that the data packets are encoded/decoded according to the bit rates allocated thereto based on the levels thereof after determining the levels of the data packets, transmission of data is more flexible.

4. As the method of this invention adopts two recovery procedures, one being the forward error correction procedure which can ensure correctness of the received data, the other being the repair procedure which is employed to recover data using the data at the receiving end 12, the reception quality of the video signals can be maintained. Due to constraints of bandwidth and buffer length, if the data of consecutive lost packets exceed the length permitted by the system buffer, using forward error correction procedure alone cannot achieve complete recovery. Therefore, in the method of this invention, the forward error correction procedure is used to first recover a part of the data, with the un-recoverable data being repaired using the packet loss concealment procedure. Thus, an acceptable level of recognition can be attained when the data are recovered and repaired under a packet loss rate of up to 40%.

5. An optimized matching parameter model is constructed in the method of this invention. By using the aforesaid model, the video processing system 100 can self-adaptively adjust the picture quality factor, which is compression ratio for key frames, and quantization coefficients for non-key frames, to adjust the coding length.

6. The method of this invention provides an interframe balancing algorithm to effectively suppress and compensate interframe jitters or interframe non-smoothness that result from use of two different computational techniques to process the key frames and the non-key frames.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A computerized method for video data stream integration and compensation, the video data stream including a plurality of key frames and a plurality of non-key frames, the non-key frames being compressible by making reference to the key frames, said method comprising:
   using a discrete wavelet transform technique to compress and encode the key frames in the video stream, and integrating interframe computations of the key frames and the non-key frames of the video data stream which are processed using a discrete cosine transform technique; and
   executing by a processor a compensation procedure according to a current code stream so as to optimize the integrated video stream;
   wherein the compensation procedure comprises:
      (A) estimating a bit rate of a data packet for the current code stream;
      (B) adjusting a current quantization coefficient based on the bit rate;
      (C) quantizing transform coefficients of the discrete cosine transform using the quantization coefficient adjusted in step (B); and
      (D) encoding quantization result of step (C),
   wherein in step (B), the bit rate is substituted into an optimized matching parameter model to adjust the quantization coefficient, and wherein the optimized matching parameter model is expressed as follows:

$$r = \left(\frac{c_1}{Q} + \frac{c_2}{Q^2} + \frac{c_3}{P}\right) * S$$

where r represents the bit rate; S represents the coding complexity; Q represents the quantization coefficient c1,c2 represent distortion constants; c3 represents a packet loss ratio; and P represents an information re-sending parameter of a current data packet.

2. The method as claimed in claim 1, wherein the compensation procedure further comprises:
 (E) performing forward error correction coding using the quantization coefficient adjusted in step (B).

3. The method as claimed in claim 1, further comprising correcting interframe balance of the key frames and the non-key frames through adjustment of luminance and picture quality factors of the key frames and non-key frames according to an algorithm of a target bit rate of a current frame, the target bit rate being determined on the basis of the number of currently used bits and the bit rate of a closest frame.

4. The method as claimed in claim 1, wherein compression and encoding of the key frames and the non-key frames of the video data stream comprises:
 detecting motion object macroblocks in the key and non-key frames of the video data stream, wherein detected motion object macroblocks are further processed, and static object macroblocks are stored in a buffer without further processing.

5. The method as claimed in claim 4, wherein the detected motion object macroblocks are inspected individually and classified by features according to several feature classes so as to achieve classified encoding.

6. The method as claimed in claim 4, wherein compression and encoding of the key frames and the non-key frames of the video data stream further comprises motion vector search processing that starts from a larger search area and that progressively increases search precision in order to gradually approximate and finally obtain a closest search result.

7. The method as claimed in claim 1, wherein the compensation procedure further comprises:
 detecting a current transmission code stream;
 distributing repair percentages to a forward error correction procedure and a packet loss concealment procedure according to the detected current transmission code stream; and
 performing compensation according to the distributed repair percentages during recovery of the video data stream.

8. The method as claimed in claim 7, wherein the forward error correction procedure is used to recover a part of the data of lost packets, whereas the remaining un-recoverable data is repaired using the packet loss concealment procedure.

9. A computerized method for video data stream integration and compensation, the video data stream including a plurality of key frames and a plurality of non-key frames, the non-key frames being compressible by making reference to the key frames, said method comprising:
 using a discrete wavelet transform technique to compress and encode the key frames in the video stream, and integrating interframe computations of the key frames and the non-key frames of the video data stream which are processed using a discrete cosine transform technique; and
 executing by a processor a compensation procedure according to a current code stream so as to optimize the integrated video stream,
 wherein the compensation procedure comprises:
  (A) estimating a bit rate of a data packet for the current code stream;
  (B) adjusting a compression ratio of the discrete wavelet transform according to the bit rate;
  (C) performing data compression using the compression ratio adjusted in step (B); and
  (D) outputting the compressed data,
 wherein in step (B), the bit rate is substituted into an optimized matching parameter model to adjust the compression ratio, and
 wherein the optimized matching parameter model is expressed as follows:

$$r = \left(\frac{c_1}{Q} + \frac{c_2}{Q^2} + \frac{c_3}{P}\right) * S$$

where r represents the bit rate; S represents the coding complexity; Q represents the compression ratio; c1,c2 represent distortion constants; c3 represents a packet loss ratio; and P represents an information re-sending parameter of a current data packet.

10. The method as claimed in claim 9, wherein the compensation procedure further comprises:
 (E) performing forward error correction coding using the compensation ratio adjusted in step (B).

11. A computerized method for video data stream integration and compensation, the video data stream including a plurality of key frames and a plurality of non-key frames, the non-key frames being compressible by making reference to the key frames, said method comprising:
 using a discrete wavelet transform technique to compress and encode the key frames in the video stream, and integrating interframe computations of the key frames and the non-key frames of the video data stream which are processed using a discrete cosine transform technique; and
 executing by a processor a compensation procedure according to a current code stream so as to optimize the integrated video stream,
 wherein the compensation procedure comprises:
  (A) estimating a bit rate of a data packet for the current code stream;
  (B) adjusting a compression ratio of the discrete wavelet transform according to the bit rate;
  (C) performing data compression using the compression ratio adjusted in step (B); and
  (D) outputting the compressed data,
 wherein step (D) further comprises:
  (D-1) setting of corresponding transmission levels of current usable bandwidths and bit rate according to different quality levels;
  (D-2) determining the level of each data packet; and
  (D-3) encoding/decoding each data packet according to the bit rate allocated to the level of the data packet.

12. A computerized method for video data stream integration and compensation, the video data stream including a plurality of key frames and a plurality of non-key frames, the non-key frames being compressible by making reference to the key frames, said method comprising:
 using a discrete wavelet transform technique to compress and encode the key frames in the video stream, and integrating interframe computations of the key frames and the non-key frames of the video data stream which are processed using a discrete cosine transform technique; and executing by a processor a compensation procedure according to a current code stream so as to optimize the integrated video stream, wherein the compensation procedure comprises:
  (A) estimating a bit rate of a data packet for the current code stream;
  (B) adjusting a current quantization coefficient based on the bit rate;
  (C) quantizing transform coefficients of the discrete cosine transform using the quantization coefficient adjusted in step (B); and
  (D) encoding quantization result of step (C), wherein step (D) further comprises:
  (D-1) setting of corresponding transmission levels of current usable bandwidths and bit rate according to different quality levels;
  (D-2) determining the level of each data packet; and
  (D-3) encoding/decoding each data packet according to the bit rate allocated to the level of the data packet.

13. A computerized method for video data stream integration and compensation, the video data stream including a plurality of key frames and a plurality of non-key frames, the non-key frames being compressible by making reference to the key frames, said method comprising:

using a discrete wavelet transform technique to compress and encode the key frames in the video stream, and integrating interframe computations of the key frames and the non-key frames of the video data stream which are processed using a discrete cosine transform technique; and executing by a processor a compensation procedure according to a current code stream so as to optimize the integrated video stream, wherein the compensation procedure comprises:
  detecting a current transmission code stream;
  distributing repair percentages to a forward error correction procedure and a packet loss concealment procedure according to the detected current transmission code stream; and
  performing compensation according to the distributed repair percentages during recovery of the video data stream, wherein the forward error correction procedure is used to recover a part of the data of lost packets, whereas the remaining un-recoverable data is repaired using the packet loss concealment procedure, wherein the forward error correction procedure comprises:
  (1) constructing a matrix G of n columns and k rows, any k*k sub-matrix g of the matrix G being invertible, each element in the matrix G being an element of the Galois Field GF(8), each of packet size bytes in k data packets corresponding to an element in the Galois Field GF (8);
  (2) performing linear transformation of the k data packets using the matrix G to obtain n data packets with packet size bytes, the n data packets being coded data of a transmitted codeword;
  (3) if a transmitted codeword having data packets not less than k is received, constructing a corresponding sub-matrix g using the columns in the matrix G to which the k data packets correspond; and
  (4) solving the only solution to the corresponding linear equation to serve as reconstructed data of k correct data packets.

* * * * *